United States Patent
Weber et al.

(10) Patent No.: US 10,866,207 B2
(45) Date of Patent: Dec. 15, 2020

(54) EXHAUST GAS SENSOR

(71) Applicant: Robert Bosch GmbH, Stuttgart (DE)

(72) Inventors: Johannes Weber, Stuttgart (DE);
Benjamin Sillmann, Moehringen (DE);
Christoph Gmelin, Stuttgart (DE);
Christopher Holzknecht, Stuttgart (DE); Karel Vacha, Mirkovice (CZ);
Katerina Lieblova, Dolni Trebonin (CZ); Milan Kotynek, Olesnik (CZ);
Rafael Gitzmann, Stuttgart (DE);
Sebastian Schulte Am Huelse, Stuttgart (DE); Simon Rentschler, Schwaikheim (DE); Stefan Buehler, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 15/772,756

(22) PCT Filed: Nov. 15, 2016

(86) PCT No.: PCT/EP2016/077686
§ 371 (c)(1),
(2) Date: May 1, 2018

(87) PCT Pub. No.: WO2017/085047
PCT Pub. Date: May 26, 2017

(65) Prior Publication Data
US 2018/0313780 A1    Nov. 1, 2018

(30) Foreign Application Priority Data

Nov. 16, 2015 (DE) .................... 10 2015 222 549
Nov. 2, 2016 (DE) .................... 10 2016 221 502

(51) Int. Cl.
*G01N 27/407* (2006.01)

(52) U.S. Cl.
CPC .................. *G01N 27/4077* (2013.01)

(58) Field of Classification Search
CPC .......................... G01N 27/403–4078
See application file for complete search history.

(56) References Cited

U.S. PATENT DOCUMENTS

| 6,346,179 B1 | 2/2002 | Makino et al. |
| 2009/0117007 A1 | 5/2009 | Furuta et al. |
| 2015/0177204 A1* | 6/2015 | Bessen ............ F02D 41/1494 |
| | | 73/1.06 |

FOREIGN PATENT DOCUMENTS

| CN | 104641216 A | 5/2015 |
| DE | 19924319 A1 | 12/2000 |

(Continued)

OTHER PUBLICATIONS

English Machine translation of DE 1020122142 (Year: 2012).*

(Continued)

*Primary Examiner* — J. Christopher Ball
(74) *Attorney, Agent, or Firm* — Norton Rose Fulbright US LLP; Gerard Messina (57) ABSTRACT

An exhaust gas sensor for detecting a measurement gas component, having a ceramic sensor element fixed in a housing, and a double-walled protective pipe having outer and inner protective sleeves, the inner sleeve enclosing a gas chamber into which the sensor element extends with a segment at the measurement gas side, in the direction of a longitudinal axis of the sensor, and an annular chamber being formed between the outer and inner protective sleeves. The outer sleeve has a cladding surface having at least one opening configured as a swirling element, through which measurement gas can move into the annular chamber with rotation about a longitudinal axis of the sensor, and the inner sleeve has at least one opening that is adjusted and/or functionally optimized, as to a sensitive region of the sensor (Continued)

element, through which opening the measurement gas can move from the annular chamber into the gas chamber.

9 Claims, 11 Drawing Sheets

(56)  References Cited

FOREIGN PATENT DOCUMENTS

| | | | | |
|---|---|---|---|---|
| DE | 102006035058 A1 * | 1/2008 | ......... | G01N 15/0656 |
| DE | 102007040507 A1 | 3/2009 | | |
| DE | 102008041046 A1 * | 2/2010 | ......... | G01N 27/4077 |
| DE | 102012214251 A1 | 2/2014 | | |
| DE | 102013221255 A1 | 4/2015 | | |
| DE | 112013006150 T5 | 9/2015 | | |
| WO | 2008078576 A1 | 7/2008 | | |

OTHER PUBLICATIONS

English Machine translation of DE 199924319 (Year: 2000).*
International Search Report for PCT/EP2016/077686, dated Mar. 17, 2017.

* cited by examiner

EXHAUST GAS SENSOR

FIELD OF THE INVENTION

The present invention is based on a gas sensor, in particular for determining the oxygen content or a particle concentration in exhaust gases of internal combustion engines, as recited in the preamble of the independent claim.

BACKGROUND INFORMATION

From DE 19628423 A1, a gas sensor is discussed that has a sensor element that is fixed in gas-tight fashion in a metallic housing. This gas sensor has a double-walled protective pipe having an outer protective sleeve and an inner protective sleeve, each having openings for the entry and/or outlet of gas. The inner protective sleeve forms a gas chamber in which the sensor element is immersed with a segment at the side of the exhaust gas. The outer protective sleeve is a sleeve having a closed cladding surface, the openings for the entry and/or outlet of gas being situated in the intermediate space at the end face of the sleeve. The gas chamber formed by the inner protective sleeve has a rectangular cross-section perpendicular to the direction of the extension of the sensor element.

SUMMARY OF THE INVENTION

With the characterizing features described herein, the gas sensor according to the present invention further develops the above-discussed gas sensor such that its dynamic behavior is improved, a functional dependence of its measurement function on its orientation in the installed position is eliminated, and its robustness is increased.

Thus, it is provided that the outer protective sleeve has a cladding surface having at least one opening configured as a swirling element through which the measurement gas can flow with rotation about a longitudinal axis of the gas sensor in the annular chamber formed between the inner protective sleeve and the outer protective sleeve.

The at least one opening configured as a swirling element can for example be a circle of openings configured on the cladding surface of the outer protective sleeve, for example at equal distances from one another and at the same height in the longitudinal extension of the sensor. The number of openings can for example be odd. The openings can for example be configured as swirling elements in that they are swirling valves made for example by pressing in or pressing out a respective segment of the outer protective sleeve.

The swirling elements are oriented in such a way that measurement gas can flow into the annular chamber with rotation about a longitudinal axis of the gas sensor. For this purpose, they are oriented in particular in a direction perpendicular to the longitudinal axis of the gas sensor. However, it can also be provided that the swirling elements additionally have a component in or opposite the longitudinal axis of the gas sensor.

Due to the fact that the measurement gas enters into the annular chamber with rotation about the longitudinal axis of the gas sensor, the dependence of the sensor function on the orientation of the gas sensor in a measurement gas flow is reduced. In addition, the effect arises that the rotation of the measurement gas in the annular chamber is suitable for keeping liquid components that may be present in the measurement gas, such as water droplets, away from the inner protective sleeve and the gas chamber, and thus from the sensor element. Instead, liquid components of the measurement gas remain on the inside of the outer protective sleeve until they evaporate or leave the annular chamber through the openings in the outer protective sleeve.

The inner protective sleeve has, in particular on its cladding surface, at least one opening through which the measurement gas can flow from the annular chamber into the gas chamber.

The at least one opening can be a single opening or a plurality of openings, for example openings having an equal distance from their neighbors, and can be situated on a circle of holes at the same height in the longitudinal extension of the gas sensor. Alternatively, the openings can also be configured with unequal distances and/or situated outside a circle of holes. The holes can for example be oriented one over the other.

According to the present invention, the at least one opening is adjusted with regard to a sensitive region of the sensor element, in particular in such a way that a functioning of the sensor element or of the gas sensor is optimized, for example with regard to its dynamic behavior and/or sensitivity, or an opening is adjusted with regard to a sensitive region of the sensor element in such a way that in particular the measurement gas is diverted towards the sensor element when passing through the opening, in the longitudinal direction of the gas sensor.

The gas sensor can be an oxygen sensor, for example a broadband lambda sensor or an NOx sensor, and can have a sensor element that has a hollow chamber in its interior and has an electrochemical cell having two electrodes of which at least one is situated in the hollow chamber, and in addition has a gas inlet hole that connects the gas chamber to the hollow chamber.

The function of such an oxygen sensor is in particular provided in that the oxygen moving into the hollow chamber is pumped over the electrochemical cell, and the resulting pump flow is available as a measure for the oxygen concentration in the measurement gas.

In the gas sensors according to the present invention, the at least one opening of the inner protective sleeve can be adjusted with regard to a sensitive region of the sensor element in that it is situated at the same height in the longitudinal extension of the gas sensor as the gas inlet hole of the sensor element. In this way, the measurement gas entering into the gas chamber moves into the hollow chamber of the sensor element as quickly as possible, in order to be accessible for sensing there. In this way, the functioning of the dynamic behavior of the gas sensor is optimized.

In a development, the inner protective sleeve can have an opening at its end face that is configured as a valve, in particular a segment pressed into the gas chamber. In comparison to a simple hole-type opening, this results in the advantage that in this way solid and liquid components of a gas can be kept away from the sensor element, even when measurement gas moves through this opening into the interior of the gas sensor, in particular into the gas chamber.

In addition or alternatively, the gas sensor can be a particle sensor whose sensor element has for this purpose an interdigital electrode made of two comb-type conductor structures that mesh with one another and are situated on a part of the outer circumference of the sensor element.

The function of such a particle sensor is that the particles present in the measurement gas, for example soot particles, accumulate on the interdigital electrode and build up an electrically conductive connection between their comb-type conductor structures. The conductivity is available as a measure of the quantity of accumulated particles. For example, here a current strength resulting from an applied voltage is evaluated. If this current strength exceeds a threshold value within a measurement cycle, then an evaluation unit connected to the sensor generates a corresponding signal that for example is then to be further interpreted as meaning that a particle filter (DPF) situated downstream from the particle sensor in the exhaust tract is defective.

In the gas sensors according to the present invention, the at least one opening of the inner protective sleeve can be adjusted with regard to a sensitive region of the sensor element in that it is made only along a part of the outer circumference of the inner protective sleeve, in such a way that it is radially oriented toward the interdigital electrode. In this way, the measurement gas entering into the gas chamber immediately reaches the interdigital electrode, and particles contained in the measurement gas can accumulate there at a high rate. The sensitivity of a particle sensor can be optimized in this way.

In a development, the at least one opening of the inner protective sleeve can have an oblong shape whose long side is oriented in the longitudinal direction of the gas sensor. Alternatively, the at least one opening of the inner protective sleeve can also be made up of a plurality of openings configured one after the other in the longitudinal direction of the gas sensor.

The present invention is not limited to oxygen sensors and/or particle sensors of the type described here in more detail. In the light of the above disclosure, the person skilled in the art will find specific embodiments of the present invention for other gas sensors.

All gas sensors can be modified in that the at least one opening of the inner protective sleeve is formed as a further swirling element oriented in the same direction as the swirling element of the outer protective sleeve in the circumferential direction, so that measurement gas entering into the annular chamber can move quickly into the gas chamber and to the sensor element while retaining its angular momentum. This measure reduces the functional dependence of the sensor signal on the orientation of the sensor element, or of the gas inlet hole, relative to the inflow direction of the exhaust gas. In this way, the scattering of the sensor signal due to the angle of rotation is reduced. For example, it is thus possible to more precisely diagnose whether the combustion processes in the various combustion chambers of the internal combustion engine are balanced with respect to one another, or for example are taking place with differing air-fuel ratios. So-called air fuel imbalance monitoring (AFIM) is enabled, which enables an important contribution to providing and securing combustion technology that is environmentally friendly and conserves resources.

The present invention can be realized on the one hand with protective pipes in which an end face of the inner protective sleeve extends past an end face of the outer protective sleeve in the longitudinal direction. This results in a gas chamber having a particularly oblong construction.

Alternatively, it can also be provided that the end face of the inner protective sleeve does not extend past the end face of the outer protective sleeve in the longitudinal direction, and that an intermediate space, separated from the annular chamber, is formed at the end face between the inner protective sleeve and the outer protective sleeve.

Exemplary embodiments of the present invention are shown in the drawings, and are explained in the following.

BRIEF DESCRIPTION OF THE DRAWINGS

FIG. 5d shows a segment at the measurement gas side of sensor element of the particle sensor is shown in an enlarged representation, along a direction of view from right to left in FIG. 5a.

DETAILED DESCRIPTION

Figure 1A:
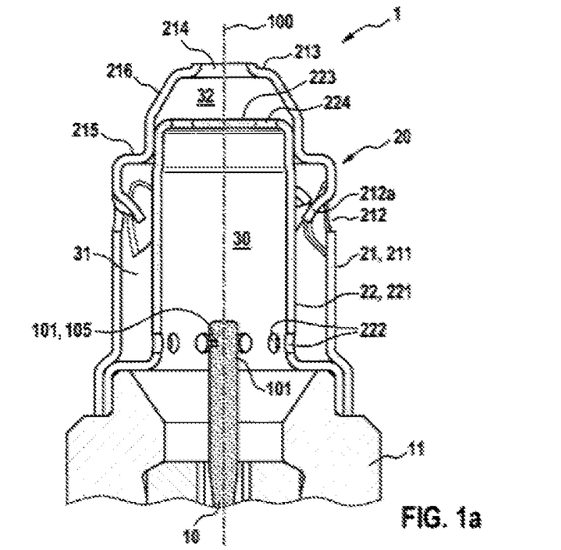
FIG. 1a shows as a first exemplary embodiment of the present invention, a gas sensor for detecting oxygen in an exhaust gas of an internal combustion engine.

FIG. 1a shows, as a first exemplary embodiment of the present invention, a gas sensor 1 for detecting oxygen in an exhaust gas of an internal combustion engine. This is a broadband lambda sensor having a ceramic sensor element 10 fixed in a housing 11. The broadband lambda sensor has a double-walled protective pipe 20 that in the example is made up of an inner protective sleeve 22 and an outer protective sleeve 21. Inner protective sleeve 22 encloses a gas chamber 30 into which sensor element 10 extends with a segment 101 at the measurement gas side. An annular chamber 31 is formed between outer protective sleeve 21 and inner protective sleeve 22. Outer protective sleeve 21 has a cladding surface 211 and an end face 213. In the example, an annular shoulder 215 and a connecting region 216 are formed between cladding surface 211 and end face 213.

Openings 212, in the form of swirling valves 212*a*, are formed on cladding surface 211 of outer protective sleeve 21, on a circumferential circle of holes, through which openings the measurement gas flows with rotation about a longitudinal axis 100 of gas sensor 1. In the example, swirling valves 212*a* are formed as inwardly bent segments. Alternatively, swirling valves 212*a* could also all be formed as outwardly bent segments.

Inner protective sleeve 22 has a cladding surface 221 and an end face 223. In the present case, inner protective sleeve 22 is formed completely in outer protective sleeve 21; in particular, end face 223 of inner protective sleeve 22 does not extend past end face 213 of outer protective sleeve 21 in the longitudinal direction of the gas sensor, and an intermediate chamber 32 is formed between inner protective sleeve 22 and outer protective sleeve 21, which intermediate chamber is fluidically separated from annular chamber 31.

Inner protective sleeve 22 has, on a circle of holes, openings 222 configured as holes through which measurement gas can move from annular chamber 31 into gas chamber 30.

Figure 1B:
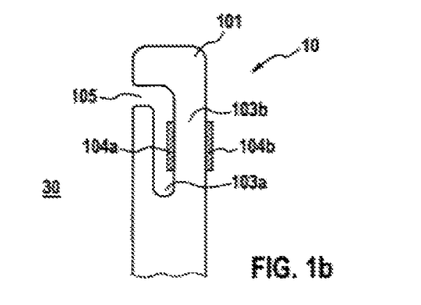
FIG. 1b shows a sensor element that has a gas inlet hole that connects a gas chamber to a hollow chamber.

Sensor element 10 of the lambda sensor is a ceramic body having a hollow chamber 103*a* in its interior and having an electrochemical cell 103*b* that has two electrodes 104*a*, 104*b*, of which one is situated in hollow chamber 103*a*. Sensor element 10 has in addition a gas inlet hole 105 that connects gas chamber 30 to hollow chamber 103*a*, as is also shown in FIG. 1*b*.

It is provided that openings 222 of inner protective sleeve 22 and gas inlet hole 105 are situated at the same height in the longitudinal extension of gas sensor 1, so that the measurement gas moving through openings 222 of inner protective sleeve 22 into gas chamber 30 can move into hollow chamber 103*a* immediately through gas inlet hole 105.

In this way, openings 222 of inner protective pipe 22 are adjusted so as to be functionally optimized with regard to gas inlet hole 105, or inner hollow chamber 103*a*.

Figure 1C:
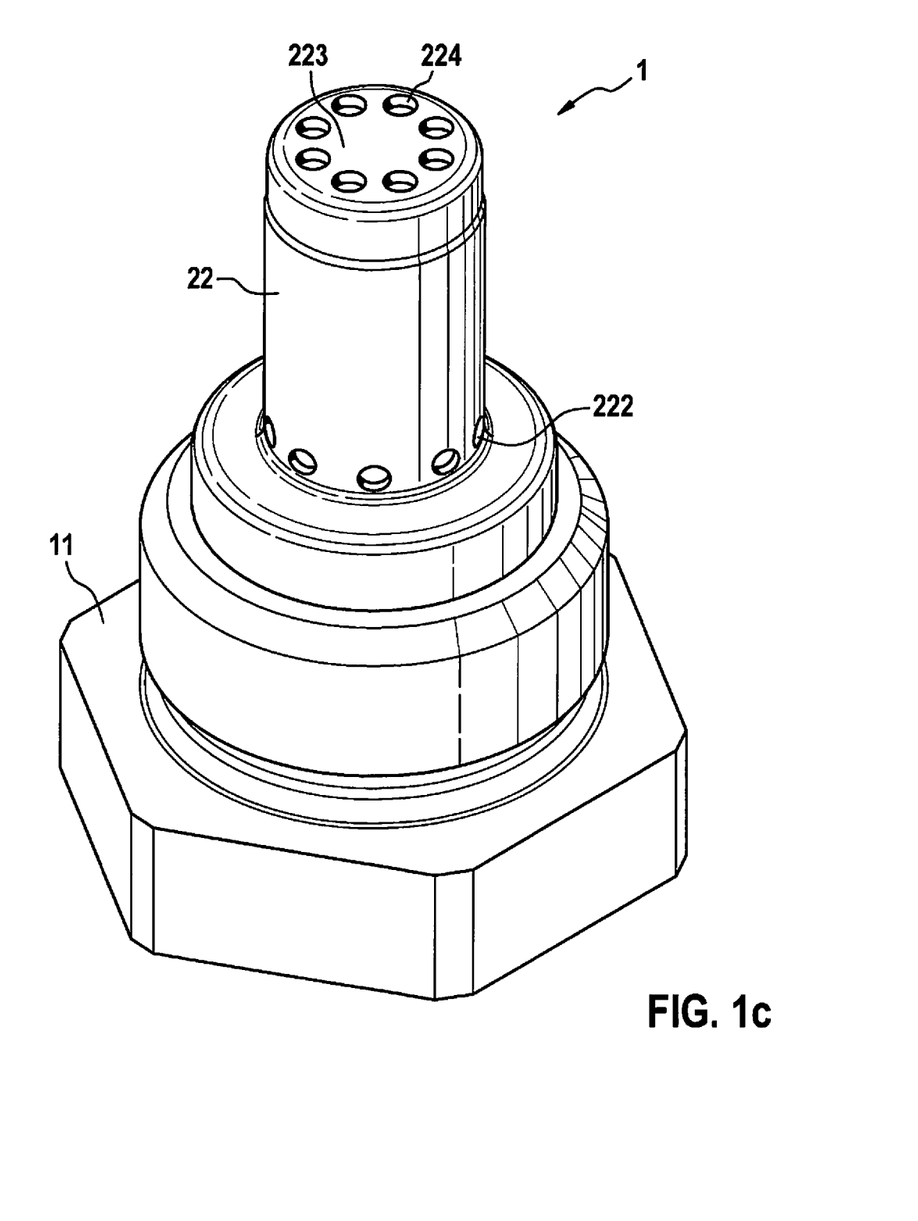
FIG. 1c shows an inner protective sleeve having a total of eight holes on its end face, and shows the gas sensor of FIG. 1a with the outer protective sleeve removed.

Inner protective sleeve 22 has a total of eight holes 224 on its end face 223, as is shown in FIG. 1*c*, which shows the gas sensor 1 shown in FIG. 1*a* with outer protective sleeve 21 removed.

Figure 2A:
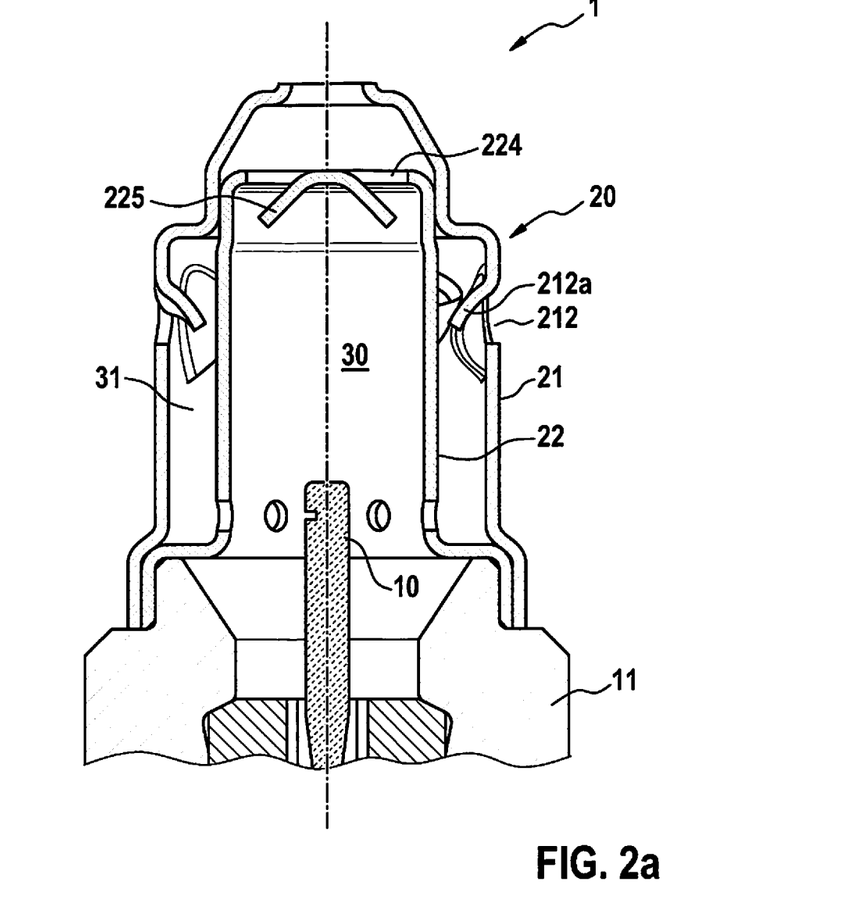
FIGS. 2a and 2b show modified specific embodiments differing from the specific embodiment shown in FIGS. 1a and 1c, and the inner protective sleeve has only two openings on its end face, formed as valves by pressing in segments.
Figure 2B:
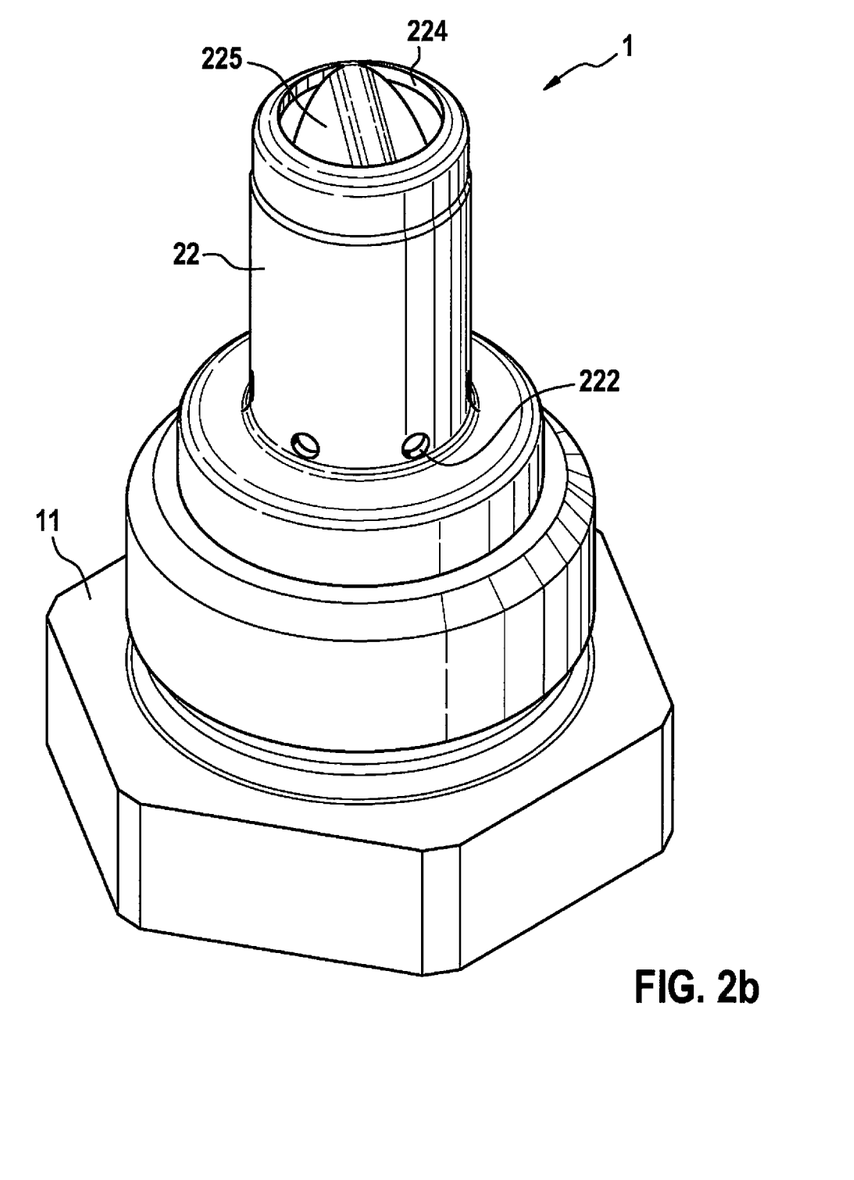

A modified specific embodiment is shown in FIGS. 2*a* and 2*b*. Differing from the specific embodiment shown with reference to FIGS. 1*a* and 1*c*, here inner protective sleeve 22 has only two openings 224 on its end face 223, formed as valves 225 by pressing in segments.

Figure 2C:
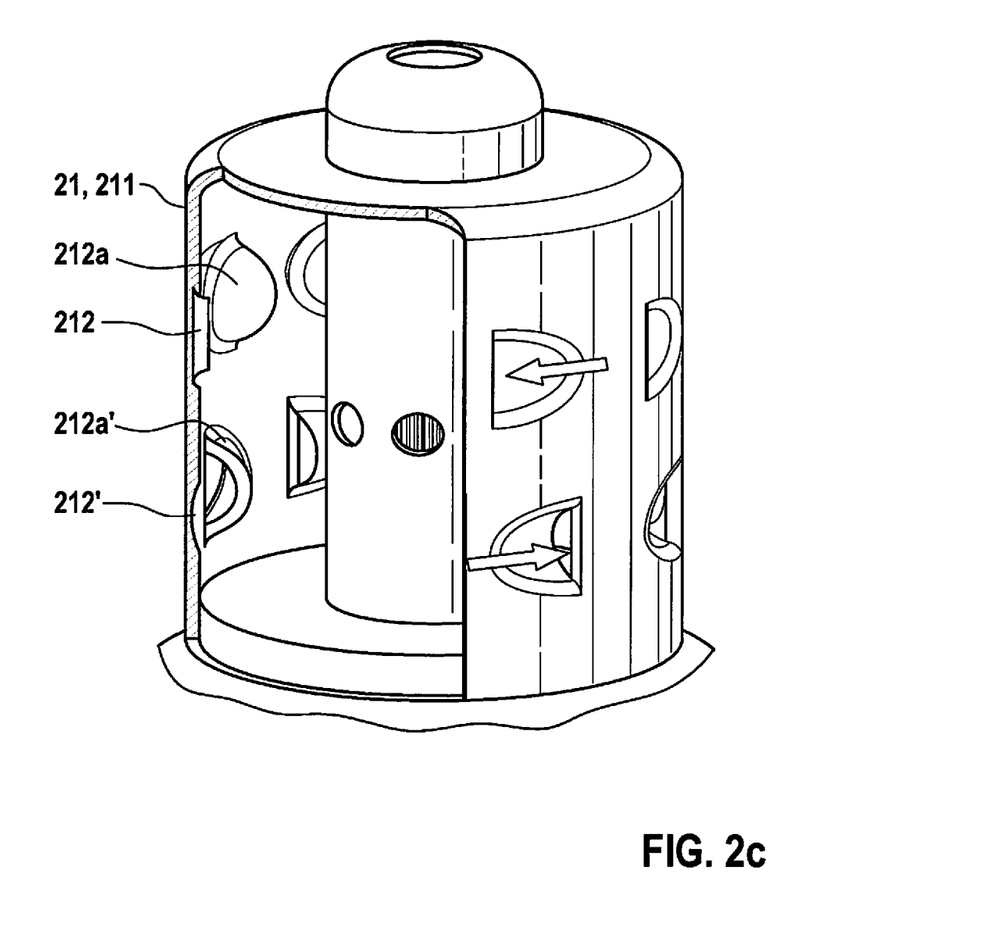
FIG. 2c shows an embodiment that differs from the specific embodiment of FIGS. 1a and 1c, and the outer protective sleeve has openings that lie on two circles of holes situated one after the other, seen in a longitudinal direction of the gas sensor.

Another modified specific embodiment is shown in FIG. 2*c*. Differing from the specific embodiment shown in FIGS. 1*a* and 1*c*, outer protective sleeve 21 has openings 212, 212' that lie on two circles of holes situated one after the other, seen in longitudinal direction 100 of the gas sensor. Openings 212, 212' are configured as swirling elements 212*a*, 212*a*', so that they introduce measurement gas into annular chamber 31 with rotation about longitudinal axis 100 of gas sensor 1. Swirling elements 212*a*, 212*a*', which are situated on the distal circle of holes, here produce a rotation that is directed opposite to the rotation produced by swirling elements 212*a*, 212*a*' situated on the proximal circle of holes.

Figure 3A:
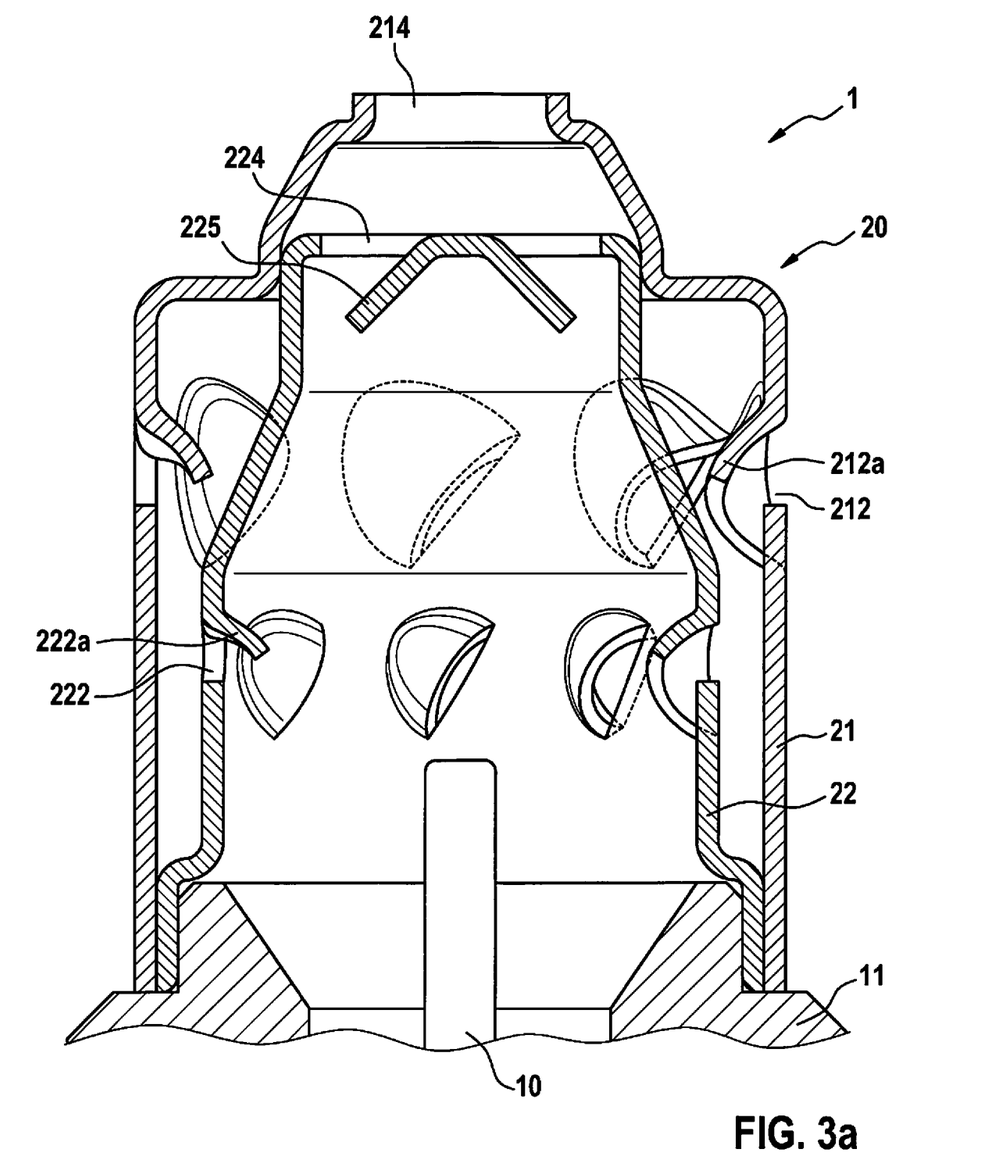
FIGS. 3a and 3b show a second exemplary embodiment of the present invention, which differs from the first exemplary embodiment presented above in that openings of the inner protective pipe are further swirling valves.
Figure 3B:
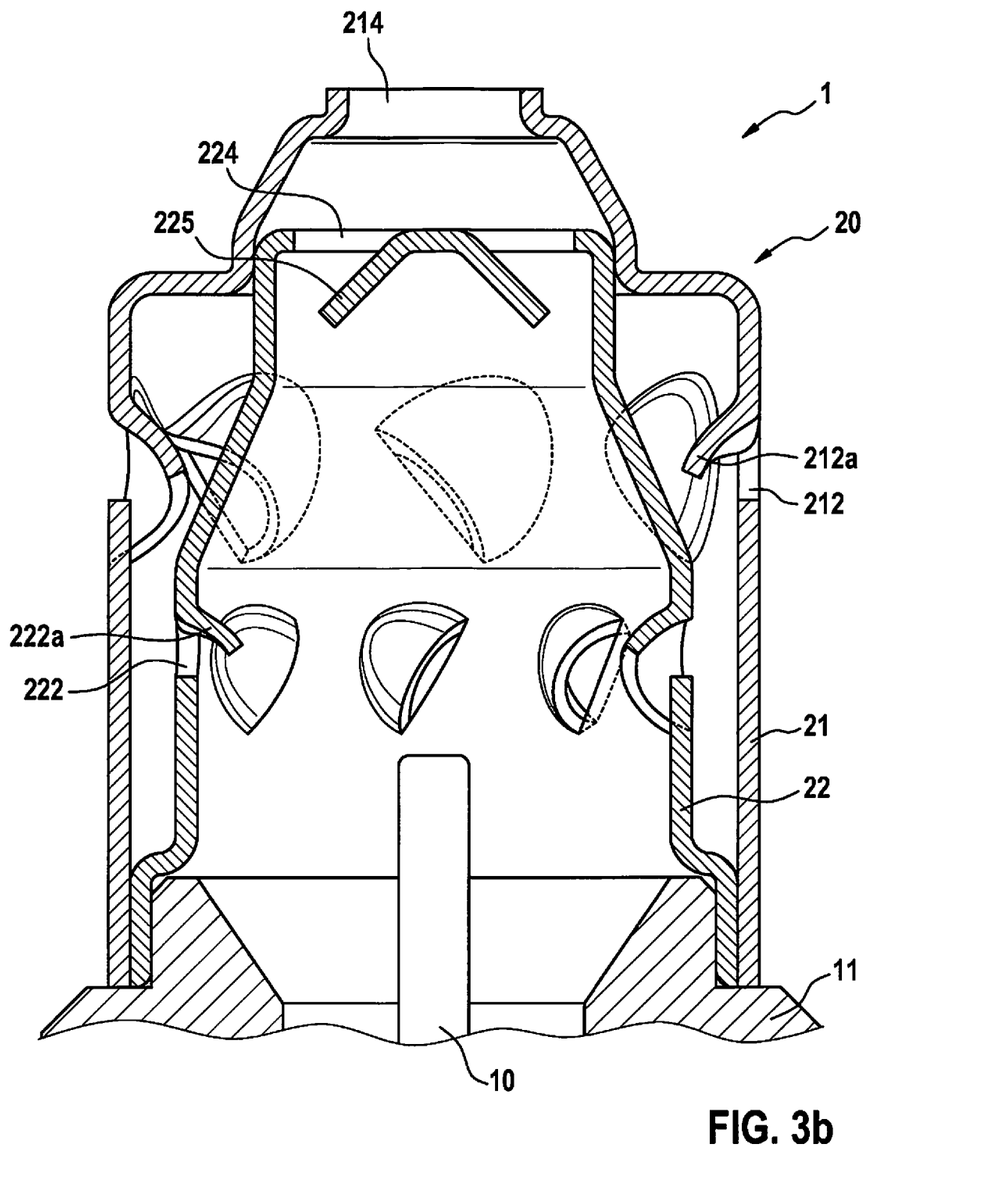
Figure 4:
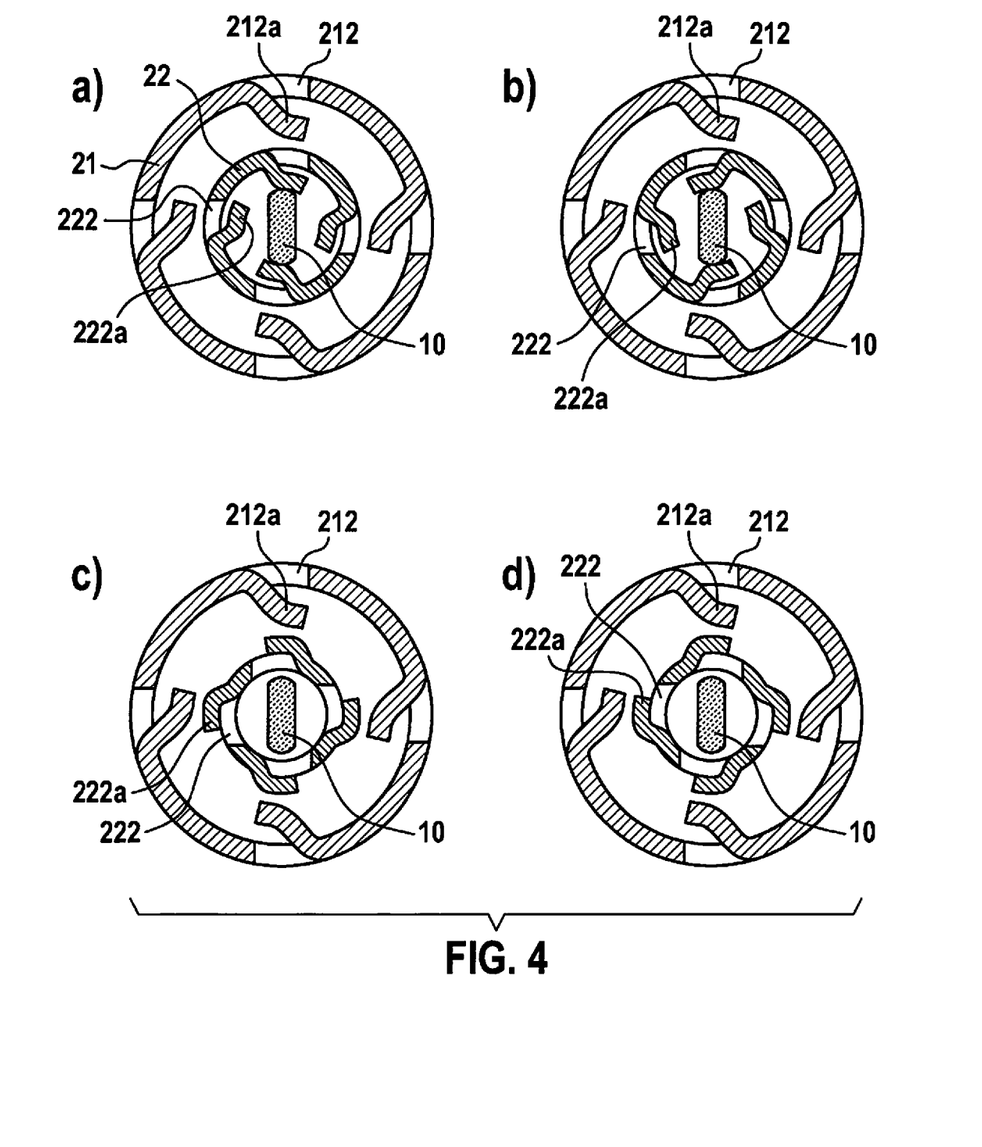
FIGS. 4a and 4c show various specific embodiments for orienting swirling valves of the outer protective sleeve and further swirling valves of the inner protective sleeve, in virtual views of the protective pipe.
FIGS. 4b and 4d show specific embodiments in which a diversion of the flow is required, which reduces the dynamic characteristic of the sensor but can protect the sensor element against penetration of water droplets that may be present in the measurement gas.

A second exemplary embodiment of the present invention is shown with reference to FIGS. 3*a* and 3*b*, as well as 4. The second exemplary embodiment differs from the first exemplary embodiment presented above in that openings 222 of inner protective pipe 22 are configured as further swirling valves 222*a*. The flow entering into gas chamber 30 is here in particular directed immediately onto gas inlet hole 105 of the sensor element.

FIG. 3*a* shows a specific embodiment in which swirling valves 212*a* of outer protective sleeve 21 and further swirling valves 222*a* of inner protective sleeve 22 are oriented in the same direction. FIG. 3*b* shows a specific embodiment in which swirling valves 212*a* of outer protective sleeve 21 and further swirling valves 222*a* of inner protective sleeve 22 are oriented in opposite directions.

Figure 3C:
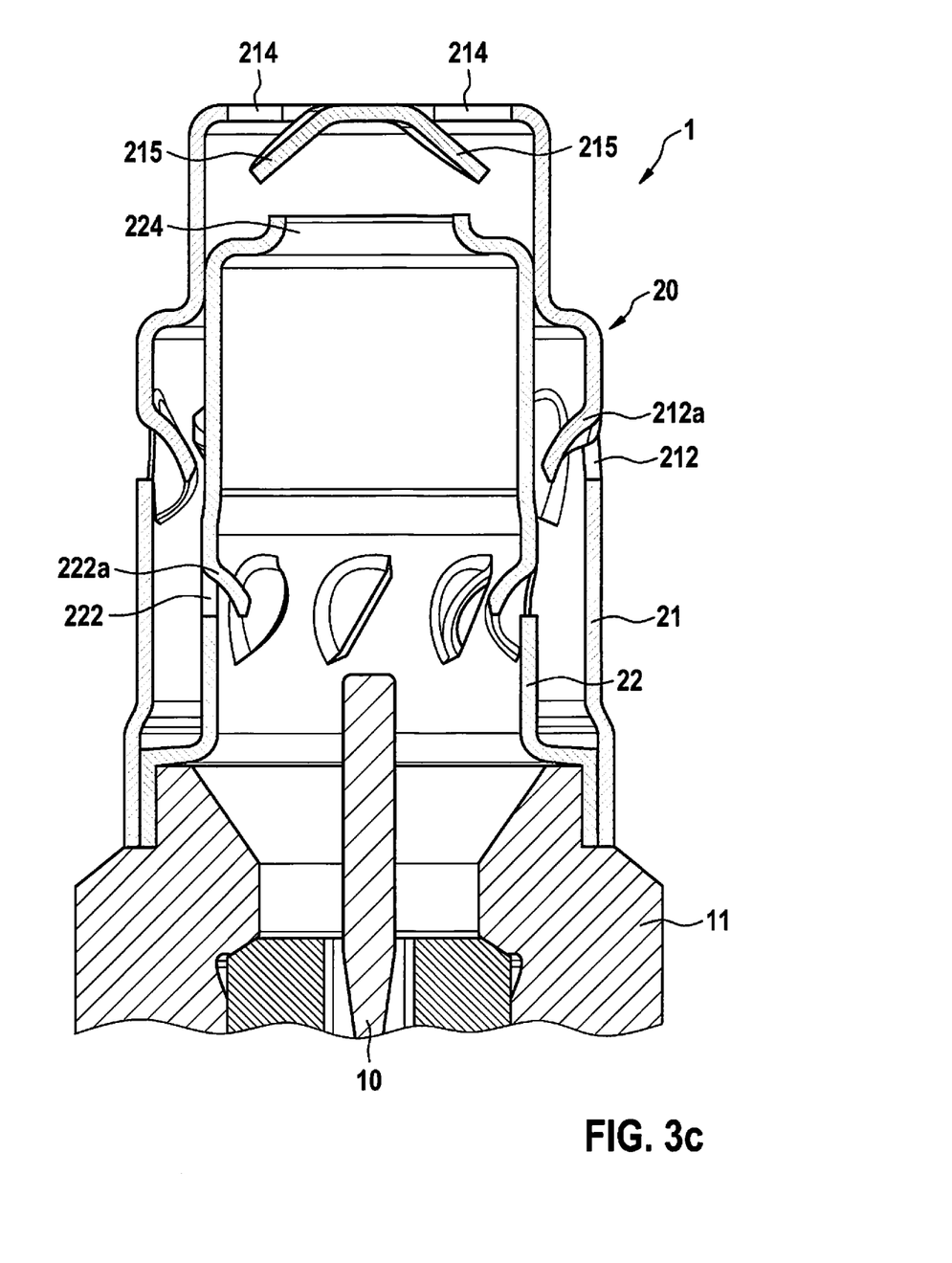
FIG. 3c shows a modification of each of the embodiments shown in FIGS. 2a, 2b, 3a, and 3b, in which it is provided that the inner protective pipe has on its end face only one central round opening.

FIG. 3*c* shows a modification of each of the embodiments shown in FIGS. 2*a*, 2*b*, 3*a*, and 3*b*. Here it is provided that inner protective pipe 22 has on its end face only one central round opening 224. This opening 224 is relatively large, for example having an opening diameter that is not smaller than half the inner diameter of inner protective pipe 22. In addition, in these modifications it is provided that outer protective pipe 21 has on its end face two openings 214 that are configured as valves 215 by pressing in segments. This modification further increases the dynamic characteristic of the gas sensor, because the flow resistance is reduced to a minimum.

Various specific embodiments for orienting swirling valves 212*a* of outer protective sleeve 21 and further swirling valves 222*a* of inner protective sleeve 22 are shown in FIG. 4, in virtual views of protective pipe 20. While for example FIG. 4*a* and FIG. 4*c* show specific embodiments in which the measurement gas can flow out of annular chamber 31 into gas chamber 30 with a high dynamic characteristic, FIGS. 4*b* and 4*d* show specific embodiments in which for this purpose a diversion of the flow is required, which reduces the dynamic characteristic of the sensor but on the other hand can very advantageously protect sensor element 10 against penetration of water droplets that may be present in the measurement gas.

Figure 5A:
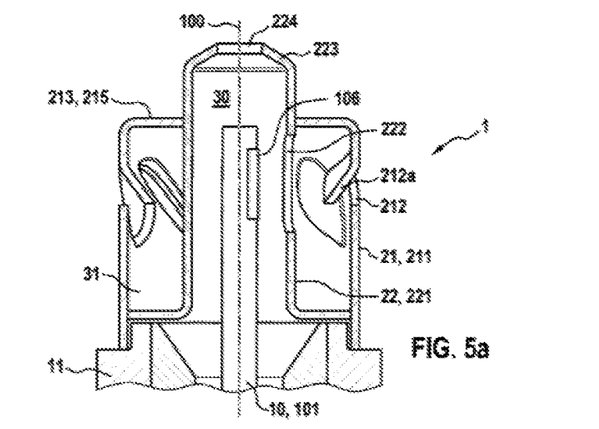
FIG. 5a shows a third exemplary embodiment of the present invention of a particle sensor for detecting soot in an exhaust gas, having a ceramic sensor element that is fixed in a housing.

As a third exemplary embodiment of the present invention, FIG. 5*a* shows a particle sensor for detecting soot in an exhaust gas, having a ceramic sensor element 10 that is fixed in a housing 11. The particle sensor has a double-walled protective pipe 20 that in the example is made up of an inner protective sleeve 22 and an outer protective sleeve 21. Inner protective sleeve 22 encloses a gas chamber 30 into which sensor element 10 extends with a segment 101 at the measurement gas side. An annular chamber 31 is formed between outer protective sleeve 21 and inner protective sleeve 22. Outer protective sleeve 21 has a cladding surface 211 and an end face 213.

On cladding surface 211 of outer protective sleeve 21, on a circumferential circle of holes openings 212 are formed in the form of swirling valves 212*a*, through which the measurement gas moves with rotation about a longitudinal axis 100 of gas sensor 1. In the example, swirling valves 212*a* are formed as inwardly bent segments. They can be oriented having an angle of from 0° to 90° to longitudinal axis 100 of the gas sensor; in the present example the angle is 45°.

Alternatively, swirling valves 212*a* can all also be formed as outwardly bent segments.

Figure 5B:
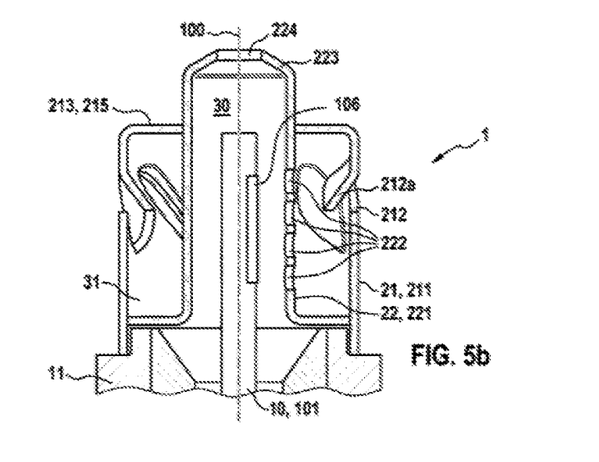
FIG. 5b shows an alternative specific embodiment in which, instead of the opening formed as an oblong hole, there are a plurality of openings formed as stationary holes situated one over the other in the longitudinal direction of the gas sensor.
Figure 5C:
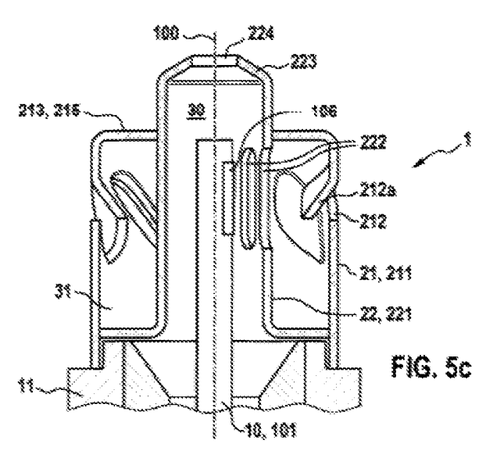
FIG. 5c shows a further alternative specific embodiment in which the opening, formed as an oblong hole, is joined by a second opening formed as an oblong hole, the two openings being offset to one another in the circumferential direction of the inner protective pipe, and in sum facing an interdigital electrode of the sensor element, analogous to the specific embodiment of the third exemplary embodiment.
Figure 5D:
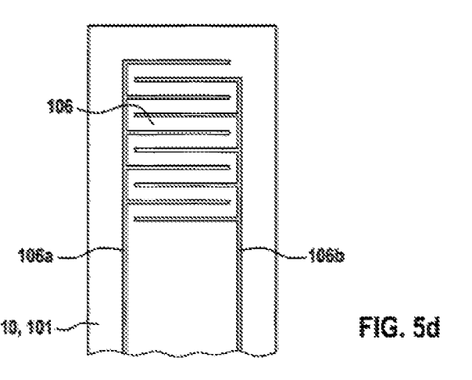

Segment 101 at the measurement gas side of sensor element 10 of the particle sensor is shown in an enlarged representation in FIG. 5*d*, along a direction of view from right to left in FIG. 5*a*. Sensor element 10 has an interdigital electrode 106 only on its side facing the observer in FIG. 5*d*. Interdigital electrode 106 is made up of two comb-type conductor structures 106*a*, 106*b* that mesh with one another.

On its cladding surface 221, inner protective sleeve 22 has exactly one opening 222, formed as a whole, which in the example is made oblong, its long side pointing in the longitudinal direction of gas sensor 1.

It is provided that opening 222 of inner protective pipe 22 and interdigital electrode 106 of sensor element 10 face one another, so that the measurement gas moving into gas chamber 30 through opening 222 of inner protective sleeve 22 immediately meets interdigital electrode 106.

In this way, opening 222 of inner protective pipe 22 is functionally optimized with regard to interdigital electrode 106.

FIG. 5b shows an alternative specific embodiment in which, instead of opening 222 formed as an oblong hole, there are a plurality of openings 222 formed as stationary holes situated one over the other in the longitudinal direction of gas sensor 1.

FIG. 5c shows a further alternative specific embodiment in which opening 222, formed as an oblong hole, is joined by a second opening 222 formed as an oblong hole, the two openings 222 being offset to one another in the circumferential direction of inner protective pipe 22 by, for example, 25° (or by 45°, or even by 90°), and in sum facing interdigital electrode 106 of sensor element 10, analogous to the specific embodiment shown above of the third exemplary embodiment.

In addition, it is possible for a plurality of slits or rows having openings situated one over the other to be provided in the circumferential direction, for example stamped in.

In protective pipe 20 shown in the third exemplary embodiment, inner protective sleeve 22 extends past outer protective sleeve 21 in the longitudinal direction, in that inner protective sleeve 22 passes through outer protective sleeve 21 at end face 213, formed as annular shoulder 215, of outer protective sleeve 21.

What is claimed is:

1. A gas sensor for detecting a component of a measurement gas,
    a ceramic sensor element that is fixed in a housing; and
    a double-walled protective pipe having an outer protective sleeve and an inner protective sleeve;
    wherein the inner protective sleeve enclosing a gas chamber into which the ceramic sensor element extends, in the direction of a longitudinal axis of the gas sensor,
    wherein an annular chamber is formed between the outer protective sleeve and the inner protective sleeve,
    wherein the outer protective sleeve has a cladding surface having at least one opening formed as a swirling element, through which measurement gas can move into the annular chamber with rotation about a longitudinal axis of the gas sensor, and
    wherein the inner protective sleeve has at least one opening that is adjusted and/or functionally optimized, with regard to a sensitive region of the ceramic sensor element, through which opening of the inner protective sleeve the measurement gas can move from the annular chamber into the gas chamber and/or is deflected in the longitudinal direction to the ceramic sensor element,
    wherein the gas sensor is a particle sensor which has an interdigital electrode that is situated only along a part of an outer circumference of the ceramic sensor element,
    wherein the gas sensor includes an oxygen sensor which has a hollow chamber formed in its interior and has an electrochemical cell, and the electrochemical cell has two electrodes of which at least one is situated in the hollow chamber, and the ceramic sensor element has a gas inlet hole that connects the gas chamber to the hollow chamber, and the at least one opening of the inner protective sleeve and the gas inlet hole are situated at the same height in the longitudinal extension of the gas sensor.

2. A gas sensor for detecting a component of a measurement gas, comprising:
    a ceramic sensor element that is fixed in a housing; and
    a double-walled protective pipe having an outer protective sleeve and an inner protective sleeve;
    wherein the inner protective sleeve enclosing a gas chamber into which the ceramic sensor element extends, in the direction of a longitudinal axis of the gas sensor,
    wherein an annular chamber is formed between the outer protective sleeve and the inner protective sleeve,
    wherein the outer protective sleeve has a cladding surface having at least one opening formed as a swirling element, through which measurement gas can move into the annular chamber with rotation about a longitudinal axis of the gas sensor, and
    wherein the inner protective sleeve has at least one opening that is adjusted and/or functionally optimized, with regard to a sensitive region of the ceramic sensor element, through which opening of the inner protective sleeve the measurement gas can move from the annular chamber into the gas chamber and/or is deflected in the longitudinal direction to the ceramic sensor element,
    wherein the gas sensor is a particle sensor which has an interdigital electrode that is situated only along a part of an outer circumference of the ceramic sensor element, and the at least one opening of the inner protective sleeve is formed only along a part of the outer circumference of the inner protective sleeve, and the interdigital electrode radially faces the at least one opening of the inner protective sleeve.

3. The gas sensor of claim 2, wherein the at least one opening of the inner protective sleeve has an oblong shape whose long side points in the longitudinal direction of the gas sensor.

4. The gas sensor of claim 2, wherein the at least one opening of the inner protective sleeve is made up of a plurality of openings situated one after the other in the longitudinal direction of the gas sensor.

5. A gas sensor for detecting a component of a measurement gas,
    a ceramic sensor element that is fixed in a housing; and
    a double-walled protective pipe having an outer protective sleeve and an inner protective sleeve;
    wherein the inner protective sleeve enclosing a gas chamber into which the ceramic sensor element extends, in the direction of a longitudinal axis of the gas sensor,
    wherein an annular chamber is formed between the outer protective sleeve and the inner protective sleeve,
    wherein the outer protective sleeve has a cladding surface having at least one opening formed as a swirling element, through which measurement gas can move into the annular chamber with rotation about a longitudinal axis of the gas sensor, and
    wherein the inner protective sleeve has at least one opening that is adjusted and/or functionally optimized, with regard to a sensitive region of the ceramic sensor element, through which opening of the inner protective sleeve the measurement gas can move from the annular chamber into the gas chamber and/or is deflected in the longitudinal direction to the ceramic sensor element,
    wherein the gas sensor is a particle sensor which has an interdigital electrode that is situated only along a part of an outer circumference of the ceramic sensor element, wherein the end face of the inner protective sleeve does not extend past the end face of the outer protective sleeve in the longitudinal direction, and at the end face an intermediate chamber is formed between the inner protective sleeve and the outer protective sleeve, which intermediate chamber is fluidically separated from the annular chamber.

6. A gas sensor for detecting a component of a measurement gas, comprising:
a ceramic sensor element that is fixed in a housing; and
a double-walled protective pipe having an outer protective sleeve and an inner protective sleeve;
wherein the inner protective sleeve enclosing a gas chamber into which the ceramic sensor element extends, in the direction of a longitudinal axis of the gas sensor,
wherein an annular chamber is formed between the outer protective sleeve and the inner protective sleeve,
wherein the outer protective sleeve has a cladding surface having at least one opening formed as a swirling element, through which measurement gas can move into the annular chamber with rotation about a longitudinal axis of the gas sensor, and
wherein the inner protective sleeve has at least one opening that is adjusted and/or functionally optimized, with regard to a sensitive region of the ceramic sensor element, through which opening of the inner protective sleeve the measurement gas can move from the annular chamber into the gas chamber and/or is deflected in the longitudinal direction to the ceramic sensor element,
wherein the outer protective sleeve has at least two openings on its end face that are configured as valves by pressing in segments.

7. The gas sensor of claim 6, wherein the inner protective sleeve has on its end face only one central round opening whose opening diameter is not smaller than half the inner diameter of the inner protective sleeve.

8. The gas sensor of claim 6, wherein the at least one opening of the inner protective sleeve is configured as a further swirling element that is oriented in the same direction in the circumferential direction as the swirling element of the outer protective sleeve.

9. A gas sensor for detecting a component of a measurement gas,
a ceramic sensor element that is fixed in a housing; and
a double-walled protective pipe having an outer protective sleeve and an inner protective sleeve;
wherein the inner protective sleeve enclosing a gas chamber into which the ceramic sensor element extends, in the direction of a longitudinal axis of the gas sensor,
wherein an annular chamber is formed between the outer protective sleeve and the inner protective sleeve,
wherein the outer protective sleeve has a cladding surface having at least one opening formed as a swirling element, through which measurement gas can move into the annular chamber with rotation about a longitudinal axis of the gas sensor, and
wherein the inner protective sleeve has at least one opening that is adjusted and/or functionally optimized, with regard to a sensitive region of the ceramic sensor element, through which opening of the inner protective sleeve the measurement gas can move from the annular chamber into the gas chamber and/or is deflected in the longitudinal direction to the ceramic sensor element,
wherein the gas sensor is a particle sensor which has an interdigital electrode that is situated only along a part of an outer circumference of the ceramic sensor element,
wherein the at least one further opening formed in the form of a valve is a segment pressed into the gas chamber.

* * * * *